United States Patent [19]

Lund et al.

[11] Patent Number: 5,469,891
[45] Date of Patent: Nov. 28, 1995

[54] METHOD FOR RELINING UNDERGROUND PIPELINES

[75] Inventors: Arne Lund; Lennart Agren, both of Boras, Sweden

[73] Assignee: Uponor Innovation AB, Fristad, Sweden

[21] Appl. No.: 170,303

[22] PCT Filed: Jun. 25, 1992

[86] PCT No.: PCT/SE92/00471

§ 371 Date: Apr. 18, 1994

§ 102(e) Date: Apr. 18, 1994

[87] PCT Pub. No.: WO93/00548

PCT Pub. Date: Jan. 7, 1993

[30] Foreign Application Priority Data

Jun. 25, 1991 [SE] Sweden ................................ 9101948

[51] Int. Cl.⁶ .......................... B29C 53/08; B29C 63/34
[52] U.S. Cl. .......................... 138/98; 138/97; 156/287; 264/36
[58] Field of Search ................ 138/97, 98, 141, 138/153, DIG. 7; 264/36, 269, 516; 156/287; 425/387.1, 392

[56] References Cited

U.S. PATENT DOCUMENTS

| | | | |
|---|---|---|---|
| 3,996,967 | 12/1976 | Takada | 138/97 |
| 4,714,095 | 12/1987 | Muller et al. | 138/98 |
| 4,867,921 | 9/1989 | Steketee, Jr. | |
| 5,029,615 | 7/1991 | Muller | 138/98 |
| 5,044,405 | 9/1991 | Driver et al. | 138/98 |
| 5,104,595 | 4/1992 | Hunter | 138/145 X |
| 5,147,697 | 9/1992 | Ijyuin et al. | 138/97 |
| 5,186,987 | 2/1993 | Inoto et al. | 138/98 X |
| 5,225,121 | 7/1993 | Yokoshima | 138/97 |

FOREIGN PATENT DOCUMENTS

| | | |
|---|---|---|
| 0351570 | 1/1990 | European Pat. Off. . |
| 0353525 | 2/1990 | European Pat. Off. . |
| 390744 | 1/1977 | Sweden . |
| 454536 | 5/1988 | Sweden . |
| 454537 | 5/1988 | Sweden . |
| 9000696 | 1/1990 | WIPO . |

*Primary Examiner*—David Scherbel
*Assistant Examiner*—Patrick F. Brinson
*Attorney, Agent, or Firm*—Merchant, Gould, Smith, Edell, Welter & Schmidt

[57] ABSTRACT

The invention relates to a material wherein the main constituent is PVC for manufacturing pipes to be used for relining underground pipelines by the pipe in a folded condition being drawn into the pipeline and being engaged with the inside surface of the pipeline by temperature increase. By the addition of polymer thermoplastic elastomers which can be mixed with PVC the material has a glass transition temperature ranging from 45° to 75° C. and a ratio (Emod, T=20° C.)/(Emod, T=75° C.)>20. The invention also relates to a method for restoring underground pipes by relining such pipes with a pipe which has been folded after the extrusion.

2 Claims, No Drawings

METHOD FOR RELINING UNDERGROUND PIPELINES

BACKGROUND OF THE INVENTION

The invention relates to a material wherein the main constituent is PVC, for manufacturing pipes to be used for relining underground pipelines by the pipe in folded condition being drawn into the pipeline and being engaged with the inside surface of the pipeline by temperature increase.

Several methods exist for restoring damaged or untight pipelines. Methods which provide engagement between the inserted relining pipe and the existing pipeline are of special interest because the capacity of the pipeline then will be reduced slightly or will not be reduced at all. In such a method a helically wound pipe is drawn into the pipeline and is brought to expand (e.g. Rib-Loc). Other methods are based on so called stockings comprising protecting layers and curable resin therebetween (e.g. in situ form), or pipes, usually of polyethylene (PE) wherein the cross section is reduced, with or without heating, by drawing the pipe through roller tools (e.g. Swage-lining).

In another prior art method a thermoplastic pipe which has been folded in connection with the extrusion thereof is drawn into an existing pipeline and is brought to engage the existing pipeline wall by inner over-pressure and temperature increase, so called coating.

There are today mainly two types of relining system based on folded pipes. One type includes systems with pipes manufactured of polyethylene (PE) or crosslinked ethylene plastic (PEX). These materials are relatively flexible at room temperature and, therefore, can be wound onto and unwound from a roll in a folded condition without heating. Storing and shipping of pipes on a roll is desired because joining of folded pipes by welding is complicated. Preferably the roll should have an inner diameter <1.5 m in order to facilitate shipping of long pipes or pipes of large diameter. However, said materials lose their rigidity relatively slowly when heated. This means that the pipes have to be heated to 115°–130° C. in order to resume the original shape thereof, which means in practice that steam under relatively high pressure must be used, which in turn necessitates the use of complicated and expensive equipment. Since polyethylene moreover cannot be heated to a temperature above 130° C. without unacceptable flow arising in the material there is obtained a very narrow "process window". Particularly when the pipelines are long or when they are located below the ground water level this provides a great drawback.

Another system is based on pipes made of polyethylene chloride (PVC). At room temperature PVC is relatively rigid and therefore must be heated before winding on a roll as well as unwinding therefrom in folded condition. Moreover, continuous heating of the pipe is required during the procedure of drawing the pipe into the pipeline. This is a serious practical drawback which requires extensive arrangements. On the contrary it is sufficient to heat pipes of PVC to 75°–90° C. in order that such pipes will return to their original cylindrical shape.

SE-B-454 536 discloses an inner lining for protection of the internal surface of a pipe. The lining is extruded as a tube, and is then reduced in size by deformation at a temperature below the recrystallisation temperature of the tube material so that it can be readily installed. After installation, the tube is then heated so that it resumes its original shape, to fit the inside of the pipe. Such heating can be effected by a heating source such as hot air being introduced to impart to the tube the required shape.

EP-A-0 353 525 discloses a thermoplastic elastomer composition of a PVC resin to which nitrite butyl rubber (NBR) is added in order to reduce the compression set of the thermoplastic elastomer, i.e. the remaining deformation after compression. The composition used is heated to a temperature of 150°–210° C. in order to achieve thermoplasticity.

SUMMARY OF THE INVENTION

The object of the present invention is to combine and thus to improve the good features of the two systems described above, the drawbacks mentioned above at the same time being avoided. This is achieved by the Material for lining underground pipes wherein the main constituent is PVC for manufacturing pipes to be used for reining underground pipelines by the pipe in a folded condition being drawn into the pipeline and being engaged with the inside surface of the pipeline by temperature increase. By the addition of polymer thermoplastic elastomers which can be mixed with PVC, the material has a glass transition temperature ranging from 45° C. to 75° C. and a ratio (Emod, T=20° C.) / (Emod, T=75° C.) > 20. The invention also relates to a method for restoring underground pipes by relining such pipes with a pipe which has been folded after the extrusion, e.g., restoring an underground pipeline by relining with a folded PVC pipe which is inserted into the pipeline and is brought to engage the inside surface thereof by increasing the temperature of the pipe, using a heat transferring medium, characterized in that the material of the PVC pipe used for restoring has a glass transition temperature ranging from 45° C. to 75° C. and a ratio (Emod, T=20° C.) /(Emod, T=75° C.) > 20, said heat transferring medium being supplied under low pressure. The break elongation of the PVC pipe at T=20° C. >200%.

The pipe material according to the invention has an elasticity at 20° C. >200 % and consists of PVC with addition of polymer thermoplastic elastomers which can be mixed with PVC, and comprises co-polymers such as Alcryn, ethylene-vinyl acetate (EVA), ethylene butyl acrylate (EBA), and nitrile butyl rubber (NBR). Co-polymers of EVA or EBA and carbon monoxide are preferred particularly.

The material described for the relining pipe provides axial flexibility at room temperature the material at the same time maintaining sufficient transverse rigidity, and has a glass transition temperature (Tg) which is substantially lower than 100° C. Such a material makes possible to provide optimally simplified manufacturing and installation procedures.

The production of pipes consisting of the material according to the invention can be effected with standard cooling and provides a material having very simple deformation contrary to pipes consisting of PE or PEX, which require special cooling in the manufacture and have a complicated deformation. No heating of the material is required at winding and at the same time a small roll diameter can be imparted to the pipe.

Thus, with regard to cooling, deformation, and roll diameter the material has obtained the good properties of the PVC system but by including therein thermoplastic elastomers it has been possible to avoid the requirement of preheating at winding.

When a pipe consisting of the material of the invention is being installed the requirement of heating in the PVC system during the procedure of drawing the pipe into the pipeline to be repaired can be avoided for the same reasons, the process temperature at the same time being kept low, which means that the use of steam under high pressure and the equipment involved therein can be avoided. A fluid under low pressure (<0.9 bar) can be used as heat transferring means for temperature increase when the inserted pipe shall be engaged with the inside surface of the existing pipeline.

The material according to the invention also provides the specific advantage that it has very good properties with regard to chemical and bacteriological resistance and wear resistance. There may be problems in achieving this in connection with the use of non-polymer additives which can also be used in order to achieve the desired properties.

In order to explain the invention in more detail reference is made to the illustrative embodiment below.

The invention is not limited to the presented illustrative embodiment but can be modified within the scope of the invention.

EXAMPLE 100 parts PVC 25 parts co-polymer EVA/carbon monoxide 10 parts NBR stabilizor, lubricant, filler With this formula the following properties of the pipe will be achieved:

Modulus of elasticity (Emod) T=20° C.;1,020 MPa

Modulus of elasticity (Emod) T=65° C.;40 MPa.

Vicat softening point, 1 kg; 65° C.

Break elongation; 250%

Tg; 55°–60° C.

Pipes of this material can be deformed without practical limitations and without the properties thereof being impaired after reversion. The pipe has excellent properties as far as wear resistance and bacteriological/chemical resistance are concerned.

We claim:

1. A method of restoring an underground pipeline, comprising the steps of:

providing a flexible folded pipe of PVC material which by an addition of polymer thermoplastic elastomers has a glass transition temperature ranging from 45° to 75° C., a ratio (Emod, T=20°)/(Emod, T=75°) > 20;

inserting said flexible pipe, without pre-heating, into the pipeline to position the pipe therein;

supplying a heat transferring fluid under low pressure to an interior of the pipe after insertion of said pipe;

increasing temperature of said pipe by heat transfer from said fluid to expand the pipe from a folded shape to engage the pipe with an inside surface of said pipeline; and leaving the pipe as a liner in said pipeline.

2. A method according to claim 1, wherein a break elongation of the PVC pipe at T=20° C. > 200%.

\* \* \* \* \*

UNITED STATES PATENT AND TRADEMARK OFFICE
CERTIFICATE OF CORRECTION

PATENT NO. : 5,469,891

DATED : 28 November 1995

INVENTOR(S) : Lund, et al.

It is certified that error appears in the above-identified patent and that said Letters Patent is hereby corrected as shown below:

Title page, item [30], Foreign Application Priority Data, Swedish Application "9101948" should be --9101948-9--.

Column 2, line 14, "Material" should be --material--.

Column 2, line 16, "reining" should be --relining--.

Column 3, between lines 11 and 12, insert the heading: --DETAILED DESCRIPTION OF THE PREFERRED EMBODIMENT--

Signed and Sealed this

Nineteenth Day of November, 1996

Attest:

BRUCE LEHMAN

*Attesting Officer*              *Commissioner of Patents and Trademarks*